United States Patent [19]

Kimura et al.

[11] Patent Number: 4,475,330
[45] Date of Patent: Oct. 9, 1984

[54] HIGH TWIST POLYESTER MULTIFILAMENT YARN AND FABRIC MADE THEREFROM

[75] Inventors: Akio Kimura, Ashiya; Osamu Wada, Takatsuki; Kohichi Iohara; Michikage Matsui, both of Ibaraki, all of Japan

[73] Assignee: Teijin Limited, Osaka, Japan

[21] Appl. No.: 384,493

[22] Filed: Jun. 3, 1982

[51] Int. Cl.³ .......................... D02G 3/04; D01F 6/62
[52] U.S. Cl. ........................................ 57/245; 57/243; 57/244; 428/364; 428/373; 428/394
[58] Field of Search .................................. 57/243–247; 428/364, 373, 392, 394, 395

[56] References Cited

U.S. PATENT DOCUMENTS 3,927,167 12/1975 Reese ................................ 57/245 X
4,115,989 9/1978 Spolnicki .............................. 57/245
4,157,419 6/1979 Mirhej .................................. 428/373
4,159,617 7/1979 Allan ................................ 428/364 X Primary Examiner—Donald Watkins
Attorney, Agent, or Firm—Burgess, Ryan & Wayne

[57] ABSTRACT

A high twist polyester multifilament yarn having a twist of a twist multiplier K within a range between 15,000 and 25,000, made from polyester filaments consisting essentially of a copolymer of two or more monomers selected from the group consisting of ethylene terephthalate, trimethylene terephthalate and tetramethylene terephthalate and/or a blend of two or more polymers of the respective monomers and having a breaking elongation of not more than 60% and a shrinkage in boiling water of not more than 6%. A woven or knitted crepe fabric obtained by employing such a high twist yarn has a desirable pebble configuration.

7 Claims, 1 Drawing Figure

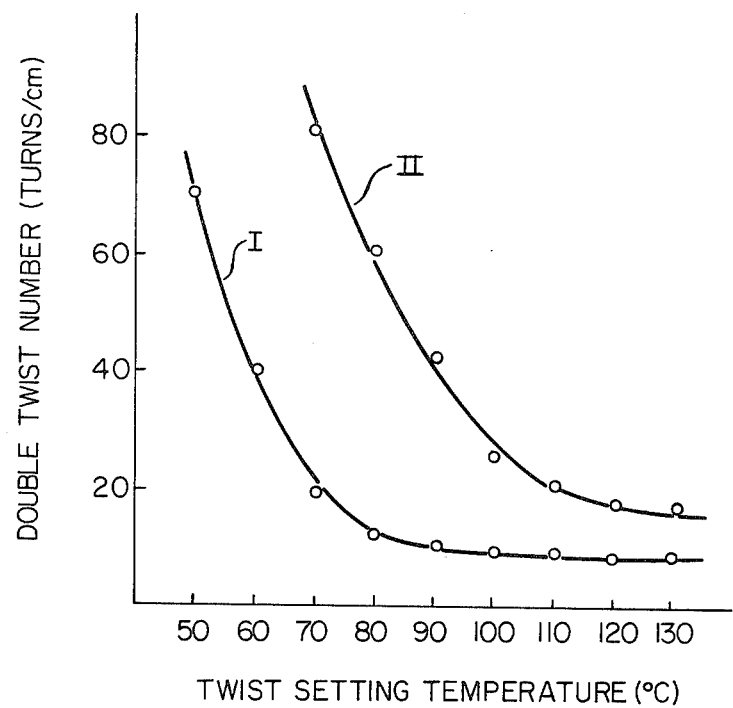

HIGH TWIST POLYESTER MULTIFILAMENT YARN AND FABRIC MADE THEREFROM

The invention relates to a high twist polyester multifilament yarn, a crepe fabric made therefrom, and a process for preparing a crepe fabric.

Generally, woven or knitted crepe fabrics composed of high twist yarns exhibit a unique hand and appearance when processed into clothing products, and, therefore, are widely used. Various types of woven or knitted crepe fabrics composed of high twist yarns consisting of filaments of thermoplastic synthetic polymers have been heretofore proposed. In a typical method, the woven or knitted crepe fabric are produced by highly twisting: polyester filament yarns; treating the highly twisted yarns at a high temperature so as to temporarily heat set the torque, thereby attaining easy handling of the yarns in the preliminary process for converting the yarns into a woven or knitted fabric and in the process for making the woven or knitted fabric; converting the resultant yarns into a woven or knitted fabric; relaxing the resultant fabric in hot water so as to release the temporarily set untwisting torque of the highly twisted yarn, thereby producing the broken appearance termed "pebble" on the surface of the fabric; and drying, tentering, and setting the pebbled fabric.

However, this method cannot produce a woven or knitted crepe fabric having the well-defined pebble and excellent pebble configuration conventionally found in silk fabrics. When high twist yarns of conventional polyester filaments are twist set at a low temperature, the temporary heat setting of the high twist yarns is not satisfactory. As a result, the handling of the resultant yarns in the preliminary process for conversion into a woven or knitted fabric and in the process for making the woven or knitted fabric becomes poor. Or, a large number of snarls are generated during the process of making the woven or knitted fabric, which may detract from the quality of the resultant woven or knitted fabric.

When the twist setting temperature is increased, the temporary heat setting of the high twist yarns becomes strong. In this case, however, heat deformation of the polyester filaments occurs. This heat deformation not only reduces the untwisting torque of the resultant woven or knitted fabric during the pebbling process, but also produces unevenness in twist setting in the internal and external layers of the twisted yarn bobbin during the twist setting procedure. This unevenness causes the resultant woven or knitted fabric to be uneven. For these reasons, it has been difficult to stably and efficiently produce a pebbled woven or knitted fabric having a satisfactory pebbling property and pebble configuration.

Various attempts have been made to overcome the above-mentioned problems. One attempt, disclosed in Japanese Patent Publication No. 56-8140, called for subjecting undrawn polyester filament yarns to high temperature treatment under relaxation or for subjecting polyester filament yarns to heat treatment under a constant length during the drawing procedure. This decreased the shrinkage of polyester filament yarns in boiling water to a satisfactory degree and, at the same time, raised the heat shrinkage stress at a high temperature of the polyester filament yarns to a level greater than that at a lower temperature, thereby improving the pebbling property of the polyester filament yarns. Although this method improved the pebbling property of the polyester filament yarns, it still required high temperature heat treatment during the twist setting procedure.

Another attempt, called for producing a woven or knitted crepe fabric by preparing high twist yarns consisting of polybutylene terephthalate filaments, heat treating the high twist yarns so as to twist set them, and converting the resultant yarns into a woven or knitted fabric. This method also, however, required high temperature treatment for the twist setting of the high twist yarns.

The above-mentioned methods were based on the discovery that high temperature twist setting does not significantly reduce pebble development during the pebbling procedure for the resultant woven or knitted fabric, therefore enabling superior pebbling property of the fabric to conventional woven or knitted fabric. Therefore, these methods did not solve the problem of the high temperature treatment for twist setting causing the resultant fabric to exhibit decreased ability to develop pebble in proportion to the temperature increase and causing an unevenness in twist setting.

Our extensive studies have shown that the above-mentioned problems can be solved by the use of a high twist yarn capable of being twist set at a relatively low temperature.

The FIGURE in the drawing shows the relationship between twist setting temperature and the double twist number.

The present invention provides a high twist polyester multifilament yarn having a twist of a twist multiplier K within a range between 15,000 and 25,000; made from polyester filaments consisting essentially of a copolymer of two or more monomers selected from the group consisting of ethylene terephthalate, trimethylene terephthalate, and tetramethylene terephthalate and/or a blend of two or more polymers of the monomers; and having a breaking elongation of not more than 60% and a shrinkage in boiling water of not more than 6%.

The polyester filaments useful for the high twist yarn according to the present invention may be obtained by melt spinning a copolymer of two or more monomers selected from the group consisting of ethylene terephthalate, trimethylene terephthalate, and tetramethylene terephthalate and/or a blend of two or more polymers of the monomers. The alkylene terephthalate polymers and copolymers used in the present invention are highly compatible with each other because of the similarity in chemical structure, and, thus, any combination of the alkylene terephthalate polymers and copolymers in any proportion may be employed in the melt spinning. However, the polyester filaments preferably consist of the copolymer or a combination of the copolymer and the blend. The copolymer or the combination of the copolymer and the blend is preferably comprised of, based on the total weight, 20% to 90% by weight of ethylene terephthalate units, i.e., copolymerized ethylene terephthalate units in the copolymer and polyethylene terephthalate in the blend, and 80% to 10% by weight of trimethylene terephthalate units, i.e., copolymerized trimethylene terephthalate units in the copolymer and polytrimethylene terephthalate in the blend, and/or tetramethylene terephthalate units, i.e., copolymerized tetramethylene terephthalate units in the copolymer and polytetramethylene terephthalate in the blend.

The polyester filament yarn used for the raw material of the high twist yarn of the present invention should have a breaking elongation of not more than 60% and a shrinkage in boiling water of not more than 6%. If the breaking elongation is more than 60%, the yarn may have poor handling in the weaving or knitting step and in the preparatory step thereof. Also, if the breaking elongation is more than 60% or the shrinkage in boiling water is more than 6%, satisfactory pebbling effect may not be attained due to the thermally unstable configuration of the filaments of the yarn.

The polyester filaments usable for the present invention consist essentially of the hereinbefore mentioned alkylene terephthalate polymers and/or copolymers. The filaments may further contain high molecular weight or low molecular weight organic or inorganic substances for various purposes, copolymerized or blended, in an amount of not more than 5% of the total weight.

The polyester filament yarn is then subjected to twisting to impart a high twist multiplier K within a range between 15,000 and 25,000. The twist multiplier K is represented by the following equation:

$$K = (\text{Number of twist per meter}) \times \sqrt{\text{denier}}$$

The polyester filament yarn may be sized prior to the twisting procedure. The application of sizing may be determined depending on the intended pebble configuration. In order to obtain a deeper and larger pebble configuration, it is preferable to apply sizing process to the polyester filament yarns. The sizing agent usable for the present invention may be selected from conventional sizing agents. Preferable sizing agents for the present invention are starch-based sizing agents, polyvinyl alcohol-based sizing agents, acryl-based sizing agents, and combinations thereof.

The high twist yarns are then subjected to a twist setting procedure. The polyester filament yarns according to the present invention may be twist set at a relatively low temperature. Usually, the twist setting procedure is carried out by wet heat setting at a temperature of from 70° C. to 130° C. or by dry heat setting at a temperature of from 70° C. to 180° C. That is to say, in accordance with the present invention, a high twist setting effect can be obtained by carrying out the twist setting procedure at a relatively low temperature.

For example, a blend of 50% by weight of polyethylene terephthalate chips having an intrinsic viscosity of 0.64 with 50% by weight of polytetramethylene terephthalate chips having an intrinsic viscosity of 0.86 was melted at a temperature of 290° C. to prepare a dope solution. The dope solution was extruded through a spinneret under a usual condition. After the extruded filaments were cooled and oiled, they were wound up at a speed of 1,000 m/minute. The resultant undrawn filaments were drawn at a speed of 800 m/minute to prepare a polyester filament yarn of 50 denier/36 filaments having a density of 1.332 g/cm$^3$ and breaking elongation of 35.8%.

The polyester filament yarn was then highly twisted so as to provide a twist of 3,000 turns/m of the yarn. The highly twisted yarn was subjected to a twist setting process at various wet heat temperatures for 30 minutes. After the twist setting process was completed, the double twist number of the resultant yarn was determined as the untwisting torque of the resultant yarn.

Measurement of Double Twist Number

A load of 2 mg/de was suspended from the middle portion of a high twist yarn having a length of 100 cm which had been twist set. The ends of the yarn were joined together and the double twist number (turns/50 cm) occurred in the yarn was measured. The double twist number is one type of second twist which is developed due to the untwisting torque of the high twist yarn. The higher the untwisting torque, the higher the double twist number.

As a comparison, a filament yarn consisting of polyethylene terephthalate alone and having a count of 50 denier/36 filament was subjected to the same twisting and twist setting processes as those mentioned above. After the twist setting process was completed, the double twist number of the resultant yarn was measured. The relationship between the twist setting temperature and the double twist number is shown in the FIGURE. In the FIGURE, the symbol I indicates the polyester filament yarn according to the present invention, while the symbol II indicates a conventional polyethylene terephthalate yarn.

It is apparent from the FIGURE that with the conventional polyethylene terephthalate filament yarn, the twist setting effect is obtained at a wet heat temperature of 90° C. or more. With the polyester filament yarn of the present invention, a wet heat temperature of 60° C. can provide the twist setting effect. This fact indicates that the present invention allows a low temperature twist setting procedure which could not have been heretofore realized because such a low temperature twist setting reduced the handling of the twist set yarn in the weaving or knitting process.

The reason why the polyester filament yarn according to the present invention can be temporarily twist set at such a low temperature is believed to be as follows: The polyester filament yarn according to the present invention may have an excellent twist setting ability, because ester interchange-copolymerization occurs to some degree between ethylene terephthalate-tetramethylene terephthalate, ethylene terephthalate-trimethylene terephthalate, and tetramethylene terephthalate-trimethylene terephthalate, or each polyester molecular chain is in a mobile state in the boundary between the blended polymers. Particularly, the behavior of the noncrystalline portions of each polyester is considered to be effective for providing such an excellent twist setting ability.

In order that the polyester filament yarn has a more excellent twist setting ability in a high twist yarn or a higher pebbling effect in a fabric, it is preferable that the polyester filament yarn have a temperature ($T_f$) of 220° C. to 255° C. at which, on a shrinkage stress-temperature curve, the shrinkage stress of the filaments becomes equal to zero due to the fusion.

Furthermore, it is preferable that the polyester filament yarn have a density of 1.300 g/cm$^3$ or more. Such polyester filament yarn can be obtained by subjecting spun filaments to a drawing procedure or by carrying out a high speed melt spinning at a speed of from 3,000 to 3,500 m/min or more. Where the density of the polyester filament yarn is lower than 1.300 g/cm$^2$, the resultant woven or knitted fabric may have a poor pebbling property.

It has further been found that if the polyester filament yarn is comprised of 3% to 15% by weight of a noncrystalline polymer, the resulting yarn can have a very excellent twist setting ability. Thus, the present invention also provides a high twist polyester multifilament yarn having a twist of a twist multiplier K within a range between 15,000 and 25,000; made from polyester filaments consisting of a composition of a copolymer of two or more monomers selected from the group consisting of ethylene terephthalate, trimethylene terephthalate, and tetramethylene terephthalate and/or a blend of two or more polymers of said monomers blended with 3 to 15% by weight, based on the weight of said copolymer and/or blend, of a noncrystalline polymer, and having a breaking elongation of not more than 60% and a shrinkage in boiling water of not more than 6%.

As the noncrystalline polymer, there may preferably be employed those having a glass transition temperature of 70° C. to 110° C., more preferably styrene polymers and methacrylate polymers.

The present invention further provides a woven or knitted crepe fabric consisting of or comprising a high twist polyester multifilament yarn having a twist of a twist multiplier K within a range between 15,000 and 25,000, made from polyester filaments consisting essentially of a copolymer of two or more monomers selected from the group consisting of ethylene terephthalate, trimethylene terephthalate, and tetramethylene terephthalate and/or a blend of two or more polymers of the respective monomers.

According to a preferred embodiment of the present invention, such a woven or knitted crepe fabric may advantageously be prepared by a process comprising the steps of:

subjecting a copolymer of two or more monomers selected from the group consisting of ethylene terephthalate, trimethylene terephthalate, and tetramethylene terephthalate and/or a blend of two or more polymers of the respective monomers to spinning and drawing to obtain a yarn of polyester filaments having a shrinkage in boiling water of not more than 6%, a density of not less than 1.300 g/cm$^3$, and a breaking elongation of not more than 60%;

subjecting the polyester multifilament yarn to twisting to apply a twist of a twist multiplier K within a range between 15,000 and 25,000 to the yarn;

subjecting the high twist yarn to twist setting;

preparing a woven or knitted fabric consisting of or comprising the high twist yarn using said high twist yarn; and then, subjecting the woven or knitted fabric to pebbling.

The high twist yarn of the present invention exhibiting an excellent twist setting property at a low temperature is converted into a woven or knitted fabric in the same manner as mentioned above. The woven or knitted fabric is subsequently subjected to a pebbling treatment in hot water at a temperature of from 80° C. to 100° C., in a wet heating atmosphere at a temperature of from 80° C. to 150° C., or in a dry heating atmosphere at a temperature of from 100° C. to 200° C. After the pebbling treatment is completed, an excellent woven or knitted crepe fabric is obtained.

That is, in accordance with the present invention, use of the polyester filament yarn exhibiting an excellent twist setting property enables a woven or knitted fabric having an excellent pebble which has not been obtained hitherto for. As described above, the excellent twist setting property is considered to be due to the copolymerized portion of the yarn or the behavior of the molecular chain in the boundary between the blended polymers of the yarn. On the other hand, the excellent pebbling property is considered to be due to the elastic property of polytetramethylene terephthalate and polytrimethylene terephthalate.

As is described above, in accordance with the present invention, the polyester filament yarn of the present invention can be twist set at a low temperature while it is in highly twisted state, such a low temperature twist setting being impossible with conventional polyester filament yarn. The twist set yarn exhibits satisfactory handling. The woven or knitted fabric prepared from the twist set yarn exhibits no unevenness in width and in pebble and exhibits a satisfactory pebbling property producing a high reduction in width. Particularly, the capability to carry out the twist setting treatment at a low temperature makes it possible to avoid a reduction in the pebble developing ability of the fabric when the fabric is subjected to the pebbling procedure. Thus, a woven or knitted crepe fabric having an excellent pebble configuration is obtained.

In a specific embodiment of the present invention, a woven crepe fabric may also be prepared by a process comprising the steps of:

weaving a mixed fabric employing (A) a polyester multifilament yarn having a shrinkage in boiling water of not more than 8% and a birefringence Δn of 0.05 to 0.11 and (B) a high twist polyester multifilament yarn having a twist of a twist multiplier K within a range between 15,000 and 25,000, made from polyester filaments consisting essentially of a copolymer of two of more monomers selected from the group consisting of ethylene terephthalate, trimethylene terephthalate, and tetramethylene terephthalate and/or a blend of two or more polymers of the respective monomers and having a shrinkage in boiling water of not more than 6%, a density of not less than 1.300 g/cm$^3$ and a breaking elongation of not more than 60%; and then, subjecting the woven fabric to pebbling.

It has further been found that the use of a yarn of the type (A) above as a warp or filling and yarn of the type (B) above as a filling or warp, respectively, enables an excellent woven crepe fabric, such as crepe, striped crepe, or oriental crepe, having the excellent pebble configuration as appears on a silk crepe fabric. That is to say, a woven crepe fabric having an excellent pebbling property and pebble configuration can be prepared, according to the above-mentioned process of the present invention, by reducing the restricting force of the warp or filling of the type (A) yarn with respect to the filling or warp of the type (B) yarn so that the torque of the type (B) yarn can easily be developed.

If the shrinkage in boiling water of the type (A) yarn is more than 8%, the shrinkage of the type (A) yarn may become large and increase the restricting force with respect to the type (B) yarn. If the birefringence is less than 0.05, the shrinkage in boiling water is too high and the type (A) yarn has the same drawback as mentioned above. On the other hand, if the birefringence is larger than 0.11, the type (A) yarn may have a too high flexural stiffness and prevent the type (B) yarn from satisfactorily developing the torque.

The yarn of the type (A) may be obtained by various methods which may be easily understood by a person with ordinary skill in the art.

For example, the yarn can be prepared by taking up spun filaments of a polyethylene terephthalate having an intrinsic viscosity of 0.5 to 0.8 at a speed of not less than 4,500 m/min. However, the optimum taking up speed may vary largely depending on the molecular weight of the polyethylene terephthalate, the catalyst, additive or third component contained in the polymer, or the like.

The yarn can also be prepared by cooling the spun filaments below a glass transition temperature, then heating them to 100° C. to 250° C., and finally taking them up at a speed of 1,500 to 4,500 m/min. The yarn can be prepared by another method wherein a yarn of undrawn filaments taken up at a speed of 2,500 to 4,000 m/min is subjected to thermal relaxation by 2% to 8% at a temperature of not lower than 50° C. and then subjected to low temperature drawing at a draw ratio of 1.2 to 1.5. The yarn can be prepared by a further method wherein a yarn of undrawn filaments taken up at a speed of 1,000 to 2,500 m/min is drawn at a ratio of about 2.0, thermally relaxed by 2% to 8% at a temperature of not lower than 150° C., and then drawn at a low temperature at a ratio of 1.2 to 1.5.

The present invention will further be illustrated by the following nonlimitative examples.

EXAMPLE 1

Blends of polyethylene terephthalate chips having an intrinsic viscosity of 0.64 with polytetramethylene terephthalate chips having an intrinsic viscosity of 0.86 at various proportions were prepared. Each blend was melted at a temperature of from 285° C. to 295° C. to prepare a dope solution. The dope solution was extruded through a spinneret having 72 holes.

The extruded filaments were cooled and oiled under usual conditions, after which the resultant filaments were wound up at a speed of 1,000 m/min. The undrawn filaments were drawn and wound up at a speed of 800 m/min by means of a usual method. The resultant drawn yarn of 100 denier/72 filaments was twisted by means of an Italian twisting machine to provide a twisted yarn having a twist of S2500 turns/m. Then, the twisted yarn was subjected to a twist setting treatment at a temperature of 70° C. for 30 minutes by means of a vacuum setter.

The physical properties of the drawn yarn, the double twist number of the resultant high twist yarn after the twist setting procedure, and the double twist number of the twist set yarn when immersed in boiling water are shown in Table 1. The double twist number (T/50 cm) in boiling water was determined by suspending a load of 2 mg/de from the middle portion of the high twist yarn having a length of 100 cm, by joining together the ends of the yarn, and by immersing the yarn in boiling water.

Moreover, the yarn was evaluated for weaving property (handling in the preliminary process for converting the yarn into a woven fabric and in the process for weaving) and pebbling property. The results are indicated in Table 1.

TABLE 1

| | Blending proportions | | Physical properties of drawn yarn | | Untwisting torque double twist number) of high twist yarn | | Properties of fabric | | |
|---|---|---|---|---|---|---|---|---|---|
| No. | Polyethylene terephthalate (% by weight) | Polytetra-methylene terephthalate (% by weight) | Density (g/cm³) | Elongation (%) | After twist setting (T/50 cm) | In boiling water (T/50 cm) | Weaving property | Pebbling property | Remark |
| 1 | 100 | 0 | 1.372 | 27 | 84 | 330 | poor | good | Comparative Example |
| 2 | 95 | 5 | 1.369 | 29 | 76 | 315 | | good | Example |
| 3 | 90 | 10 | 1.363 | 28 | 48 | 285 | good | good | " |
| 4 | 70 | 30 | 1.349 | 37 | 44 | 280 | good | good | " |
| 5 | 50 | 50 | 1.332 | 36 | 21 | 280 | good | good | " |
| 6 | 20 | 80 | 1.314 | 31 | 32 | 320 | good | good | " |
| 7 | 10 | 90 | 1.306 | 34 | 80 | 340 | | good | " |
| 8 | 0 | 100 | 1.298 | 28 | 340 | 410 | very poor | good | Comparative Example |

EXAMPLE 2

Each of the drawn yarns as prepared in Example 1 was highly twisted to provide a high twist yarn having a twist of 2,800 turns/m. The twisted yarn was subjected to a twist setting procedure. The twist setting procedure was carried out for 30 minutes by means of a vacuum setter at a temperature such that the untwisting torque of the twisted yarn was 50 turns/50 cm or less, which temperature had been preliminarily determined in a laboratory.

The weaving property and the pebbling property of the high twist yarn were determined in accordance with the same manner as that described in Example 1. The results are shown in Table 2.

TABLE 2

| | Blending proportions | | | Untwisting torque of high twist yarn | | Properties of fabric | | | |
|---|---|---|---|---|---|---|---|---|---|
| No. | Polyethylene terephthalate (% by weight) | Polytetra-methylene terephthalate (% by weight) | Twist setting temperature (°C.) | After twist setting (T/50 cm) | In boiling water (T/50 cm) | Weaving property | Pebbling property | Width reduction percentage (%) | Remark |
| 1 | 100 | 0 | 95 | 52 | 195 | good | poor | 23 | Comparative Example |
| 2 | 95 | 5 | 90 | 55 | 205 | good | | 26 | Example |
| 3 | 90 | 10 | 70 | 51 | 295 | good | good | 67 | " |
| 4 | 70 | 30 | 70 | 45 | 280 | good | good | 65 | " |
| 5 | 50 | 50 | 65 | 32 | 290 | good | good | 71 | " |
| 6 | 20 | 80 | 70 | 41 | 330 | good | good | 74 | " |
| 7 | 10 | 90 | 100 | 48 | 220 | good | | 30 | " |
| 8 | 0 | 100 | 105 | 53 | 210 | good | poor | 28 | Comparative |

TABLE 2-continued

| | Blending proportions | | Untwisting torque of high twist yarn | | | Properties of fabric | | | |
|---|---|---|---|---|---|---|---|---|---|
| No. | Polyethylene terephthalate (% by weight) | Polytetramethylene terephthalate (% by weight) | Twist setting temperature (°C.) | After twist setting (T/50 cm) | In boiling water (T/50 cm) | Weaving property | Pebbling property | Width reduction percentage (%) | Remark |
| | | | | | | | | | Example |

The width reduction percentage after the pebbling as shown in Table 2 was determined according to the following equation. The higher the width reduction percentage, the better the pebbling property.

Width reduction percentage =

$$\frac{\left(\begin{array}{c}\text{Width in cm}\\\text{of gray fabric}\end{array}\right) - \left(\begin{array}{c}\text{Width in cm of woven fabric}\\\text{after pebbling procedure}\end{array}\right)}{(\text{Width in cm of gray fabric})} \times 100$$

The difference between the untwisting torque developed in boiling water and the untwisting torque after the twist setting, as shown in Table 2, indicates an ability to form a pebble on the fabric surface, that is, a pebble developing ability.

EXAMPLE 3

A blend of 50% by weight of polyethylene terephthalate chips having an intrinsic viscosity of 0.64 with 50% by weight of polytetramethylene terephthalate having an intrinsic viscosity of 0.86 was prepared. The blend was melted at a temperature of 290° C. to prepare a dope solution. The dope solution was extruded through a spinneret having 24 holes.

The extruded filaments were cooled and oiled under usual conditions, after which the resultant filaments were taken up at a speed of 1,000 m/min.

The undrawn filaments were drawn at various draw ratios to prepare yarns Nos. 1, 2, 3, and 5, each having a different density.

Separately, a blend consisting of 50% by weight of polyethylene terephthalate chips having an intrinsic viscosity of 0.64, 25% by weight of polytetramethylene terephthalate chips having an intrinsic viscosity of 0.86 and 25% by weight of polytrimethylene terephthalate chips having an intrinsic viscosity of 0.96, was prepared. The blend was melted at a temperature of 285° C. to prepare a dope solution. The dope solution was extruded in a similar manner to that described above.

Then, the undrawn filaments were drawn to prepare yarns Nos. 4 and 6, each having a different density.

Each of the resultant drawn yarns having a count of 50 denier/24 filaments was subjected to a high twisting procedure (S and Z twist) to provide twisted yarns each having a twist of 3,000 turns/m. The high twist yarns were heat treated at a wet heat temperature of 70° C. for 30 minutes to temporarily set the twists of the yarn. The yarns were converted into a plain weave fabric having a warp density of 32/cm of a weft density of 37/cm and comprising two S twist yarns and two Z twist yarns alternately. The acting reed width was 120 cm, the warping length was 55 m, and the fabric length was 50 m.

Then, the resultant gray fabric was subjected to a pebbling procedure in hot water at a temperature of 98° C. for 30 minutes by means of a rotary washer in accordance with a usual method. The width reduction percentage after the pebbling procedure and the pebbling property of the fabric are indicated in Table 3.

TABLE 3

| No. | Polymer Type | Ratio (%) | Density g/cm³ | Breaking elongation (%) | Width reduction percentage (%) | Pebbling property | Remark |
|---|---|---|---|---|---|---|---|
| 1 | Polyethylene terephthalate | 50 | | | | | |
| | Polytetramethylene terephthalate | 50 | 1.289 | 38 | 32 | | Example |
| 2 | Polyethylene terephthalate | 50 | | | | | |
| | Polytetramethylene terephthalate | 50 | 1.293 | 37 | 34 | | Example |
| 3 | Polyethylene terephthalate | 50 | | | | | |
| | Polytetramethylene terephthalate | 50 | 1.308 | 37 | 63 | good | Example |
| 4 | Polyethylene terephthalate | 50 | | | | | |
| | Polytetramethylene terephthalate | 25 | | | | | |
| | Polytrimethylene terephthalate | 25 | 1.316 | 38 | 67 | good | Example |
| 5 | Polyethylene terephthalate | 50 | | | | | |
| | Polytetramethylene terephthalate | 50 | 1.334 | 34 | 77 | very good | Example |
| 6 | Polyethylene terephthalate | 50 | | | | | |
| | Polytetramethylene terephthalate | 25 | | | | | |
| | Polytrimethylene terephthalate | 25 | 1.341 | 32 | 79 | very good | Example |

EXAMPLE 4

Blends of polyethylene terephthalate chips (dried at 160° C. for 4 hours) having an intrinsic viscosity of 0.64 containing 0.05% by weight of TiO$_2$ as flatting agent with polytetramethylene terephthalate chips (dried at 120° C. for 6 hours) having an intrinsic viscosity of 0.86 at various proportions were prepared. Each blend was melted at a temperature of from 285° C. to 295° C. to prepare a dope solution. The dope solution was extruded through a spinneret having 72 holes of a circular cross-section of 0.3 mm diameter.

The extruded filaments were cooled and oiled under usual conditions, after which the resultant filaments were wound up at a speed of 1,000 m/min. The undrawn filaments were drawn and heat set on a hot roller at 180° C. The resultant drawn yarn of 100 denier/72 filaments was twisted by means of an Italian twisting machine to provide a twisted yarn having a twist of S2500 turns/m. Then, the twisted yarn was subjected to a twist setting treatment at a temperature of 90° C. by means of a vacuum steam setter.

The physical properties of the drawn yarn, the untwisting torque of the resultant high twist yarn after the twist setting procedure, and the untwisting torque of the twist set yarn when immersed in boiling water are shown in Table 4.

TABLE 4

| | Blending proportions | | Physical properties of drawn yarn | | | Untwisting torque (double twist number) of high twist yarn | | |
|---|---|---|---|---|---|---|---|---|
| No. | Polyethylene terephthalate (% by weight) | Polytetra- methylene terephthalate (% by weight) | Elon- gation (%) | Shrinkage in boiling water (%) | Tf (°C.) | After twist setting (T/50 cm) | In boiling water (T/50 cm) | Remark |
| 1 | 100 | 0 | 25 | 1.6 | 260 | 160 | 435 | Comparative Example |
| 2 | 95 | 5 | 27 | 1.9 | 258 | 140 | 420 | Example |
| 3 | 90 | 10 | 26 | 2.8 | 255 | 125 | 410 | " |
| 4 | 70 | 30 | 34 | 3.4 | 246 | 75 | 385 | " |
| 5 | 50 | 50 | 33 | 4.5 | 235 | 45 | 390 | " |
| 6 | 20 | 80 | 30 | 5.1 | 227 | 60 | 445 | " |
| 7 | 10 | 90 | 30 | 4.7 | 229 | 150 | 480 | " |
| 8 | 0 | 100 | 25 | 3.2 | 233 | 370 | 515 | Comparative Example |

EXAMPLE 5

A fabric was woven on a water jet loom (Nissan WJL LW-41) at 360 rpm using as filling each of the high twist yarns as prepared in Example 4 and as warp a polyethylene terephthalate multifilament yarn of 50 denier/36 filaments. The fabric was scoured with a weak alkali and pebbled on a rotary washer at boil for 20 min. The results are shown in Table 5.

TABLE 5

| No. | Weaving property | Pebbling property | Remark |
|---|---|---|---|
| 1 | X | o | Comparative Example |
| 2 | | o | Example |
| 3 | Δ | o | " |
| 4 | o - Δ | o - | " |
| 5 | o | o - | " |
| 6 | o | o | " |
| 7 | | o | " |
| 8 | XX | — | Comparative |

TABLE 5-continued

| No. | Weaving property | Pebbling property | Remark |
|---|---|---|---|
| | | | Example |

Weaving Property
XX: Weaving is impossible
X: Weaving is somewhat difficult
Δ: Weaving is possible
o: Weaving is easy
Pebbling Property
o: Good
⊚: Very good

EXAMPLE 6

Blends of polyethylene terephthalate chips (dried at 160° C. for 4 hours) having an intrinsic viscosity of 0.64 containing 0.05% by weight of TiO2 and polytrimethylene terephthalate chips (dried at 120° C. for 6 hours) having an intrinsic viscosity of 0.65 were converted into drawn yarns and, then, high twist yarns, as described in Example 4.

The physical properties of the drawn yarns and the untwisting torques of the high twist yarns are shown in Table 6.

TABLE 6

| | Blending proportions | | Physical properties of drawn yarn | | | Untwisting torque of high twist yarn | | |
|---|---|---|---|---|---|---|---|---|
| No. | Polyethylene terephthalate (% by weight) | Polytri- methylene terephthalate (% by weight) | Elon- gation (%) | Shrinkage in boiling water (%) | Tf (°C.) | After twist setting (T/50 cm) | In boiling water (T/50 cm) | Remark |
| 1 | 100 | 0 | 26 | 1.6 | 260 | 160 | 435 | Comparative Example |
| 2 | 95 | 5 | 30 | 2.1 | 256 | 140 | 426 | Example |
| 3 | 90 | 10 | 29 | 2.7 | 253 | 120 | 422 | " |
| 4 | 70 | 30 | 31 | 3.4 | 240 | 85 | 408 | " |
| 5 | 50 | 50 | 32 | 4.6 | 228 | 60 | 412 | " |
| 6 | 20 | 80 | 30 | 5.5 | 220 | 80 | 483 | " |
| 7 | 10 | 90 | 30 | 5.0 | 221 | 210 | 517 | " |
| 8 | 0 | 100 | 28 | 3.5 | 225 | 460 | 552 | Comparative Example |

EXAMPLE 7

Blends of polyethylene terephthalate chips having an intrinsic viscosity of 0.64, polytetramethylene terephthalate chips having an instrinsic viscosity of 0.85 at various proportions, and polystyrene (Styrone 679, by Asahi Dow Co.) were prepared. Each blend was melted at a temperature of from 285° C. to 295° C. to prepare a dope solution. The dope solution was extruded through a spinneret having 72 holes of a circular cross-section of a 0.25 mm diameter.

The extruded filaments were cooled and oiled under usual conditions, after which the resultant filaments were wound up at a speed of 1,000 m/min.

The undrawn filaments were drawn at a preheating temperature of 80° C. and heat set on a hot roller at 180° C. by wrapping the filaments on the roller 8 times. The resultant drawn yarn was twisted to provide a twisted yarn having a twist of 2,500 turns/m. Then, the twisted yarn was subjected to a twist setting treatment at a temperature of 90° C. by means of a steam bath.

The physical properties of the drawn yarn and the untwisting torques of the resultant high twist yarn are shown in Table 7.

TABLE 7

| | Blending proportions | | | Physical properties of drawn yarn | | | | Untwisting torque of high twist yarn | | |
|---|---|---|---|---|---|---|---|---|---|---|
| No. | Polyethylene terephthalate (%) | Polytetramethylene terephthalate (%) | Polystyrene (%) | de/fil | Elongation (%) | Shrinkage in boiling water (%) | $T_f$ (°C.) | After twist setting (T/50 cm) | In boiling water (T/50 cm) | Remark |
| 1 | 100 | 0 | 0 | 49/36 | 28 | 1.9 | 260 | 160 | 430 | Comparative Example |
| 2 | 0 | 100 | 0 | 52/36 | 26 | 3.2 | 233 | 365 | 515 | Comparative Example |
| 3 | 95 | 0 | 5 | 50/36 | 26 | 2.3 | 259 | 110 | 405 | Comparative Example |
| 4 | 0 | 95 | 5 | 50/36 | 29 | 3.0 | 231 | 215 | 480 | Comparative Example |
| 5 | 76 | 19 | 5 | 51/36 | 33 | 3.1 | 251 | 70 | 385 | Example |
| 6 | 69.6 | 17.4 | 13 | 48/36 | 28 | 3.3 | 249 | 45 | 370 | " |
| 7 | 66.4 | 16.6 | 17 | 49/36 | 27 | 3.3 | 248 | 40 | 350 | Comparative Example |
| 8 | 78.4 | 19.6 | 2 | 52/36 | 28 | 2.9 | 252 | 105 | 395 | Comparative Example |
| 9 | 47.5 | 47.5 | 5 | 50/36 | 30 | 4.6 | 232 | 30 | 380 | Example |
| 10 | 19 | 76 | 5 | 50/36 | 32 | 5.5 | 226 | 70 | 440 | " |

EXAMPLE 8

A fabric was woven on a water jet loom (Nissan WJL LW-41) at 360 rpm using as filling each of the high twist yarns (except for No. 7 yarn) as prepared in Example 7 and as warp a polyethylene terephthalate multifilament yarn of 50 denier/36 filaments. The fabric was scoured with a weak alkali and pebbled on a rotary washer at boil for 20 min.

The results are shown in Table 8.

TABLE 8

| No. | Weaving property | Pebbling property | Remark |
|---|---|---|---|
| 1 | X | — | Comparative Example |
| 2 | XX | — | Comparative Example |
| 3 | X - Δ | o | Comparative Example |
| 4 | X | — | Comparative Example |

TABLE 8-continued

| No. | Weaving property | Pebbling property | Remark |
|---|---|---|---|
| 5 | Δ - o | o | Example |
| 6 | o | o | " |
| 8 | X - Δ | o | Comparative Example |
| 9 | o | o | Example |
| 10 | Δ - o | o | " |

EXAMPLE 9

Blends of polyethylene terephthalate chips having an intrinsic viscosity of 0.64 with polytetramethylene terephthalate chips having an intrinsic viscosity of 0.86 at various proportions were prepared. Each blend was melted at a temperature of from 285° C. to 295° C. to prepare a dope solution. The dope solution was extruded through a spinneret having 72 holes.

The extruded filaments were cooled and oiled under usual conditions, after which the resultant filaments were wound up at a speed of 1,000 m/min. The undrawn filaments were drawn between a feed roller at 80° C. and a drawing roller at 180° C. at a draw ratio of 3.0, heat treated at 200° C., and wound up at a speed of 800 m/min by means of a usual method. The resultant drawn yarn of 100 denier/72 filaments was twisted by means of an Italian twisting machine to provide a twisted yarn having a twist of S2500 turns/m. Then, the twisted yarn was subjected to a twist setting treatment at a temperature of 70° C. for 30 minutes by means of a vacuum setter.

The physical properties of the drawn yarn, the untwisting torques of the resultant high twist yarn and the properties of the resultant fabric are shown in Table 9.

TABLE 9

| | Blending proportions | | Physical properties of drawn yarn | | Untwisting torque of high twist yarn | | Properties of fabric | | |
|---|---|---|---|---|---|---|---|---|---|
| No. | Polyethylene terephthalate (% by weight) | Polytetramethylene terephthalate (% by weight) | Elongation (%) | Shrinkage in boiling water (%) | After twist setting (T/50 cm) | In boiling water (T/50 cm) | Weaving property | Pebbling property | Remark |
| 1 | 100 | 0 | 25 | 1.6 | 168 | 441 | poor | good | Comparative Example |
| 2 | 95 | 5 | 27 | 1.9 | 142 | 426 | | good | Example |
| 3 | 90 | 10 | 26 | 2.8 | 118 | 408 | good | good | " |

TABLE 9-continued

| | Blending proportions | | Physical properties of drawn yarn | | Untwisting torque of high twist yarn | | Properties of fabric | | |
|---|---|---|---|---|---|---|---|---|---|
| No. | Polyethylene terephthalate (% by weight) | Polytetra-methylene terephthalate (% by weight) | Elon-gation (%) | Shrinkage in boiling water (%) | After twist setting (T/50 cm) | In boiling water (T/50 cm) | Weaving property | Pebbling property | Remark |
| 4 | 70 | 30 | 34 | 3.4 | 70 | 380 | good | good | " |
| 5 | 50 | 50 | 33 | 4.5 | 43 | 394 | good | good | " |
| 6 | 20 | 80 | 30 | 5.1 | 62 | 448 | good | good | " |
| 7 | 10 | 90 | 30 | 4.7 | 152 | 484 | | good | " |
| 8 | 0 | 100 | 25 | 3.2 | 378 | 517 | poor | good | Comparative Example |

EXAMPLE 10

A blend of 50% by weight of polyethylene terephthalate chips having an intrinsic viscosity of 0.64 with 50% by weight of polytetramethylene terephthalate having an intrinsic viscosity of 0.86 was prepared. The blend was melted at a temperature of 296° C. to prepare a dope solution. The dope solution was extruded through a spinneret having 24 holes.

The extruded filaments were cooled and oiled under usual conditions, after which the resistant filaments were taken up at a speed of 1000 cm/min.

The undrawn filaments were drawn at various draw ratios to prepare yarns Nos. 1, 3, 5, and 7, each having a different density and shrinkage in boiling water.

Separately, a blend consisting of 50% by weight of polyethylene terephthalate chips having an intrinsic viscosity of 0.64, 25% by weight of polytetramethylene terepthalate chips having an intrinsic viscosity of 0.36, and 25% by weight of polytrimethylene terephthalate chips having an intrinsic viscosity of 0.96 was prepared. The blend was melted at a temperature of 285° C. to prepare a dope solution. The dope solution was extruded in a similar manner to that described above. Then, the undrawn filaments were drawn to prepare yarns Nos. 2, 4, and 6, each having a different density and shrinkage in boiling water.

Each of the resultant drawn yarns having a count of 50 denier/24 filaments was subjected to a high twisting procedure (S and Z twist) to provide a twisted yarn, each having a twist of 3000 turns/m. The high twist yarns were heat treated at a wet heat temperature of 70° C. for 30 minutes to temporarily set the twists of the yarn. The yarns were converted into a plain weave fabric having a warp density of 32/cm and a weft density of 37/cm and comprising two S twist yarns and two Z twist yarns alternately. The acting reed width was 120 cm, the warping length was 55 m, and the fabric length was 50 m.

Then, the resultant gray fabric was subjected to a pebbling procedure in hot water at a temperature of 98° C. for 30 minutes by means of a rotary washer in accordance with the usual method. The width reduction percentage after the pebbling procedure and the pebbling property of the fabric are shown in Table 10.

TABLE 10

| | Polymer | | | Density (g/cm³) | Shrinkage in boiling water (%) | Width reduction percentage (%) | Pebbling property | Remark |
|---|---|---|---|---|---|---|---|---|
| No. | Type | | Ratio % | | | | | |
| 1 | Polyethylene terephthalate | | 50 | | | | | |
| | Polytetramethylene terephthalate | | 50 | 1.289 | 9.2 | 12 | | Example |
| 2 | Polyethylene terephthalate | | 50 | | | | | |
| | Polytetramethylene terephthalate | | 25 | 1.294 | 5.5 | 27 | | Example |
| | Polytrimethylene terephthalate | | 25 | | | | | |
| 3 | polyethylene terephthalate | | 50 | | | | | |
| | Polytetramethylene terephthalate | | 50 | 1.305 | 8.4 | 40 | | Example |
| 4 | Polyethylene terephthalate | | 50 | | | | | |
| | Polytetramethylene terephthalate | | 25 | 1.314 | 9.0 | | | |
| | Polytrimethylene terephthalate | | 25 | | | 43 | | Example |
| 5 | Polyethylene terephthalate | | 50 | | | | | |
| | Polytetramethylene terephthalate | | 50 | 1.307 | 3.5 | 64 | good | Example |
| 6 | Polyethylene terephthalate | | 50 | | | | | |
| | Polytetramethylene terephthalate | | 25 | | | | | |
| | Polytrimethylene terephthalate | | 25 | 1.318 | 4.3 | 67 | good | Example |
| 7 | Polyethylene terephthalate | | 50 | | | | | Example |

TABLE 10-continued

| | Polymer | | | Shrinkage in boiling | Width reduction | | |
|---|---|---|---|---|---|---|---|
| No. | Type | Ratio % | Density (g/cm³) | water (%) | percentage (%) | Pebbling property | Remark |
| | Polytetramethylene terephthalate | 50 | 1.348 | 3.8 | 87 | | |

EXAMPLE 11

A polyethylene terephthalate of an intrinsic viscosity of 0.64 was melt spun at 290° C. through a spinneret of 24 holes, and the spun filaments were taken up at a speed of 5,000 m/min. The resultant polyester filament yarn (A) of 75 denier/24 filaments was then twisted at a low twist of S300 turns/m and warped at a warp density of 50/cm.

A blend of 50% by weight of polyethylene terephthalate chips having an intrinsic viscosity of 0.64 with 50% by weight of polytetramethylene terephthalate having an intrinsic viscosity of 0.86 was prepared. The blend was melted at a temperature of 290° C. to prepare a dope solution. The dope solution was extruded through a spinneret having 24 holes.

The extruded filaments were cooled and oiled under usual conditions, after which the resultant filaments were taken up at a speed of 1000 cm/min.

The resultant undrawn yarn was drawn at a draw ratio of 3.0 between a feed roller at 80° C. and a drawing roller at 180° C., heat treated at 200° C., and taken up at 800 m/min.

The drawn yarn of 75 denier/24 filament was twisted at S2500 turns/m and subjected to wet heat twist setting at 80° C. for 30 min.

Using the high twist yarn (B) as filling at a density of 33/cm, a plain woven fabric was prepared. The fabric was then subjected to pebbling in hot water at 98° C. on a rotary washer for 20 min. or by a continuous pebbling procedure for 5 min.

For comparison, a polyethylene terephthalate of an intrinsic viscosity of 0.64 was melt spun at 290° C. through a spinneret of 24 holes and the spun filaments were taken up at a speed of 1,200 m/min. The resultant undrawn yarn was drawn at draw ratio of 3.3 on a draw pin at 90° C. at a speed of 500 m/min and taken up after bringing it in touch with a hot plate of a 30 cm length at 180° C. The drawn yarn of 75 denier/24 filaments was twisted at a low twist of S300 turns/m and warped at a warp density of 50/cm. Then, a plain fabric was prepared and treated, as mentioned above.

The results are shown in Table 11.

TABLE 11

| | Properties | Example | Comparative Example |
|---|---|---|---|
| Warp | Shrinkage in boiling water (%) | 5.5 | 2.5 |
| | Birefringence | 0.099 | 0.167 |
| | Young's modulus (kg/mm²) | 745 | 1280 |
| Fabric | Width reduction percentage | 82.4 | 14.5 |
| | Pebbling in rotary washer | Possible | Pebble unevenness |
| | Continuous pebbling | Possible | Impossible |
| | Pebble configuration | Fine, deep | Fine but |

TABLE 11-continued

| Properties | Example | Comparative Example |
|---|---|---|
| | and even | uneven |

We claim:

1. A high twist polyester multifilament yarn having a twist of a twist multiplier K within a range of 15,000 to 25,000 made from polyester filaments consisting essentially of at least one member selected from the group consisting of a copolymer of at least two units selected from the group consisting of ethylene terephthalate, trimethylene terephthalate, and tetramethylene terephthalate, a blend of at least two polymers selected from the group consisting of polyethylene terephthalate, polytrimethylene terephtalate and a blend of at least one of said polymers and at least one of said polymers having a breaking elongation of not more than 60% and a shrinkage in boiling water of not more than 6%.

2. A high twist yarn as claimed in claim 1, wherein said polyester filaments consist essentially of at least one member selected from the group consisting of said copolymer and said blend, wherein said polyester filaments are comprised of, based on the total weight of said polyester in said filaments 20% to 90% by weight of ethylene terephthalate units, and 80% to 10% by weight of at least one unit selected from the group consisting of trimethylene terephthalate units and tetramethylene terephthalate units.

3. A high twist yarn of claim 1 or 2 wherein said polyester filaments at a temperature in the range of 220° C. to 255° C. at which the shrinkage stress of the filaments, on a shrinkage stress-temperature curve, is equal to zero due to fusion.

4. A high twist polyester multifilament yarn having a twist of a twist multiplier K within a range of 15,000 to 25,000, made from polyester filaments consisting essentially of a mixture of at least one member selected from the group consisting of a copolymer of at least two units selected from the group consisting of ethylene terephthalate, trimethylene terephthalate and tetramethylene terephthalate, a blend of at least two polymers selected from the group consisting of polyethylene terephthalate, polytrimethylene terephthalate, and polytetramethylene teraphthalate and a blend of at least one of said polymers and at least one said copolymers with 3% to 15% by weight, based on the weight of said polyester, of a noncrystalline polymer, said mixture having a breaking elongation of not more than 60% and a shrinkage in boiling water of not more than 6%.

5. A high twist yarn of claim 4, wherein said noncrystalline polymer is at least one member selected from the group consisting of a styrene polymer acid a methacrylate polymer.

6. A crepe fabric comprising a yarn of claim 1.

7. A crepe fabric comprising a yarn of claim 5.

* * * * *